United States Patent
Kishita et al.

(10) Patent No.: US 9,180,750 B2
(45) Date of Patent: Nov. 10, 2015

(54) VEHICULAR THERMO-CONTROL DEVICE

(75) Inventors: Hiroshi Kishita, Anjo (JP); Masayuki Takeuchi, Nukata-gun (JP); Hideaki Okawa, Kariya (JP); Seiji Inoue, Nukata-gun (JP); Nobuharu Kakehashi, Toyoake (JP); Koji Miura, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 164 days.

(21) Appl. No.: 14/117,814

(22) PCT Filed: Jun. 6, 2012

(86) PCT No.: PCT/JP2012/003687
§ 371 (c)(1),
(2), (4) Date: Nov. 14, 2013

(87) PCT Pub. No.: WO2012/172751
PCT Pub. Date: Dec. 20, 2012

(65) Prior Publication Data
US 2015/0128632 A1    May 14, 2015

(30) Foreign Application Priority Data

Jun. 13, 2011    (JP) .................................. 2011-131414

(51) Int. Cl.
*B60H 1/00*    (2006.01)
*F25B 30/02*    (2006.01)
(Continued)

(52) U.S. Cl.
CPC ........ *B60H 1/00278* (2013.01); *B60H 1/00271* (2013.01); *B60H 1/00392* (2013.01);
(Continued)

(58) Field of Classification Search
CPC ........... B60H 1/00278; B60H 1/00392; B60H 1/00907; B60H 11/1875; B60H 1/00271; B60L 1/02; B60L 1/003; B60L 3/003; B60L 3/0046; B60L 11/1874; Y02T 10/705; Y02T 10/7005

USPC ........................................... 62/324.6; 165/61
See application file for complete search history.

(56) References Cited

U.S. PATENT DOCUMENTS 7,124,594 B2 * 10/2006 McRell .............................. 62/59
2004/0068997 A1    4/2004 Hirooka et al.
(Continued)

FOREIGN PATENT DOCUMENTS

JP    H11-301254 A    11/1999
JP    2000-161794 A    6/2000
(Continued)

OTHER PUBLICATIONS

International Search Report mailed Aug. 28, 2012 in a corresponding PCT application No. PCT/JP2012/003687.
(Continued)

*Primary Examiner* — Mohammad M Ali
(74) *Attorney, Agent, or Firm* — Harness, Dickey & Pierce, P.L.C.

(57) ABSTRACT

A vehicular thermo-control device adjusts a temperature of a battery. The device has a primary system through which cooling water circulates, and a secondary system through which a refrigerant circulates. The primary system has a heat exchanger which performs heat exchange between the battery and the cooling water, and a heat exchanger which performs heat exchange between the cooling water and an ambient air. The secondary system is a refrigerating cycle. Both heat exchangers on a high temperature side and a low temperature side of the refrigerating cycle are thermally coupled with the primary system. Only one heat exchanger provides heat exchange with the ambient air. The pump of the primary system can switch circulating direction of the cooling water. A controller controls devices to perform cooling and heating operation.

8 Claims, 6 Drawing Sheets

(51) Int. Cl.
    *B60L 11/18* (2006.01)
    *F25B 29/00* (2006.01)
    *H01M 10/625* (2014.01)
    *H01M 10/663* (2014.01)
    *H01M 10/66* (2014.01)
    *B60L 1/00* (2006.01)
    *B60L 1/02* (2006.01)
    *B60L 3/00* (2006.01)

(52) U.S. Cl.
    CPC ............ *B60H1/00907* (2013.01); *B60L 1/003* (2013.01); *B60L 1/02* (2013.01); *B60L 3/003* (2013.01); *B60L 3/0046* (2013.01); *B60L 3/0061* (2013.01); *B60L 11/1874* (2013.01); *B60L 11/1875* (2013.01); *F25B 29/003* (2013.01); *F25B 30/02* (2013.01); *H01M 10/625* (2015.04); *H01M 10/66* (2015.04); *H01M 10/663* (2015.04); *B60L 2240/36* (2013.01); *B60L 2240/425* (2013.01); *B60L 2240/525* (2013.01); *B60L 2240/545* (2013.01); *B60L 2240/662* (2013.01); *Y02T 10/705* (2013.01); *Y02T 10/7005* (2013.01)

(56) References Cited

U.S. PATENT DOCUMENTS

| | | | |
|---|---|---|---|
| 2008/0251235 A1* | 10/2008 | Zhou | 165/41 |
| 2009/0139781 A1* | 6/2009 | Straubel | 180/65.1 |
| 2009/0293507 A1* | 12/2009 | Narayanamurthy et al. | 62/59 |
| 2011/0000247 A1* | 1/2011 | Narayanamurthy | 62/333 |
| 2011/0048058 A1* | 3/2011 | Narayanamurthy et al. | 62/434 |
| 2011/0061410 A1* | 3/2011 | Narayanamurthy | 62/115 |

FOREIGN PATENT DOCUMENTS

| | | |
|---|---|---|
| JP | 2001-018635 A | 1/2001 |
| JP | 3149493 B2 | 3/2001 |
| JP | 2001-159557 A | 6/2001 |
| JP | 2002-168551 A | 6/2002 |
| JP | 2002-352867 A | 12/2002 |
| JP | 2008-105645 A | 5/2008 |
| JP | 2010-064651 A | 3/2010 |

OTHER PUBLICATIONS

Written Opinion mailed Aug. 28, 2012 in a corresponding PCT application No. PCT/JP2012/003687.

Office action dated Dec. 3, 2013 in corresponding Japanese Application No. 2011-131414.

Office action dated Apr. 1, 2015 in corresponding Chinese Application No. 201280027309.9.

* cited by examiner

< FIRST COOLING OPERATION >

< SECOND COOLING OPERATION >

< FIRST HEATING OPERATION >

< SECOND HEATING OPERATION >

< THIRD HEATING OPERATION >

VEHICULAR THERMO-CONTROL DEVICE

CROSS-REFERENCE TO RELATED APPLICATION

This application is a 371 National Phase of International Application PCT/JP2012/003687, filed on Jun. 6, 2012, based on Japanese Patent Application No. 2011-131414 filed on Jun. 13, 2011, the contents of which are incorporated herein by reference in its entirety.

TECHNICAL FIELD

The present disclosure relates to a vehicular thermo-control device which adjusts a temperature of a thermal load on the vehicle by using a cold-hot thermal device, such as a refrigerating cycle.

BACKGROUND ART

PTL 1, PTL2, and PTL 3 disclose vehicular thermo-control devices each of which adjusts a temperature of a battery mounted on the vehicle and a temperature of a passenger compartment of the vehicle. PTL 1 discloses a device which cools a battery down by using air or a cooling water. Furthermore, PTL1 also discloses a device which cools air or the cooling water for cooling the battery by using a thermal apparatus, such as a refrigerating cycle. PTL 2 also discloses a thermo-control device which has a cooling water circuit for cooling the battery, and a refrigerating cycle. PTL 3 also discloses a thermo-control device which has a cooling water circuit for cooling the battery, and a refrigerating cycle.

CITATION LIST

Patent Literature

PTL 1: JP3149493B
PTL 2: JP2002-352867A
PTL 3: JP2010-64651A

SUMMARY OF INVENTION

However, in a case of the device in PTL1, in order to provide heat exchange between the battery and an ambient air of the vehicle, it is necessary to mount a heat exchanger for the cooling water and a heat exchanger for the refrigerating cycle, i.e., a condenser, to the vehicle so that heat exchange is performed with the ambient air of the vehicle. For this reason, there is a problem that configuration of the thermo-control device may be complicated. Moreover, a problem that it is necessary to carry two heat exchangers for the ambient air on the vehicle. In a case of PTL 2, it is also needed to mount a heat exchanger for cooling water and a condenser for the refrigerating cycle. In a case of PTL3, it is configured that the cooling water for cooling the battery performs heat exchange only with the refrigerating cycle. For this reason, only the condenser of the refrigerating cycle is provided on the vehicle. However, with this configuration, in order to adjust the temperature of the battery, it is necessary to certainly operate the refrigerating cycle.

It is an object of the present disclosure to provide a vehicular thermo-control device which is easy to mount on the vehicle and has a simple configuration.

It is another object of the present disclosure to provide a vehicular thermo-control device which has a single heat exchanger for the ambient air.

It is still another object of the present disclosure to provide a vehicular thermo-control device which is capable of heating and cooling a thermal load on the vehicle by a simple configuration.

An embodiment of the present disclosure provides a vehicular thermo-control device. The device has a thermal load (2, 602) mounted on a vehicle. The device has a primary system (3) through which a thermal-transport medium circulates, the primary system having a load heat exchanger (31) for carrying out heat exchange between the thermal load and the thermal-transport medium and an ambient heat exchanger (32) for carrying out heat exchange between an ambient air and the thermal-transport medium. The device has a cold-hot thermal device (4, 504) which has a high-temperature-side heat-exchanger (42) for carrying out heat exchange to the thermal-transport medium, and a low-temperature-side heat-exchanger (44) for carrying out heat exchange to the thermal-transport medium, and which provides a temperature difference between the high-temperature-side heat-exchanger and the low-temperature-side heat-exchanger.

According to this configuration, heat can be dissipated to the ambient air by using the primary system. Furthermore, since the cold-hot thermal device can heat or cool the thermal-transport medium, the cold-hot thermal device can adjust the temperature of the thermal load through the primary system. The cold-hot thermal device is configured to be thermally coupled with the primary system via both of the high-temperature-side heat-exchanger and the low-temperature-side heat-exchanger. For this reason, only the ambient heat exchanger of the primary system alone is used as the heat exchanger for providing heat exchange with the ambient air. Therefore, the vehicular thermo-control device having simple configuration is provided.

In addition, the symbols in the parenthesis indicated in the above section and the claim merely show correspondence relations with concrete elements described in embodiments later mentioned as one example, and are not intended to limit the technical scope of this disclosure.

DESCRIPTION OF EMBODIMENTS

Figure 1:
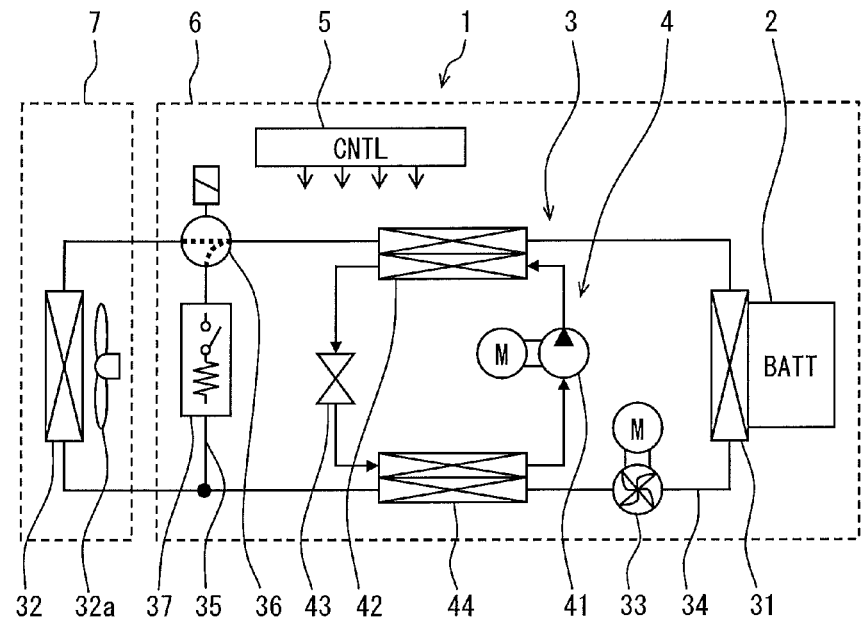
FIG. 1 is a block diagram showing a vehicular thermo-control device according to a first embodiment of the present disclosure.

Referring to the drawings, embodiments of the present disclosure will be described hereinafter. In these embodiments, the same parts and components as those in each embodiment are indicated with the same reference numerals and the same descriptions will not be reiterated. In a case that only a part of component or part is described, other descriptions for the remaining part of component or part in the other description may be incorporated. Components and parts corresponding to the components and parts described in the preceding description may be indicated by the same reference number and may not be described redundantly. The embodiments may be partially combined or partially exchanged in some forms which are clearly specified in the following description. In addition, it should be understood that, unless trouble arises, the embodiments may be partially combined or partially exchanged each other in some forms which are not clearly specified.

First Embodiment

FIG. 1 is a block diagram showing a vehicular thermo-control device 1 according to a first embodiment of the present disclosure. A vehicular thermo-control device 1 adjusts a temperature of a battery (BATT) 2 which is a thermal load on a vehicle by using a cold-hot thermal device, such as a refrigerating cycle. The thermal load is the battery 2. The battery 2 is a rechargeable battery which supplies electric power to an electric motor for propelling the vehicle. The battery 2 can be provided with a lithium ion battery etc. The battery 2 supplies hundreds of volts output.

The vehicular thermo-control device 1 has a primary system 3 through which a thermal-transport medium for performing heat exchange with the battery 2 is circulated. The thermal-transport medium is a cooling water containing an anti-freezing solution. The primary system 3 is also called as a cooling water cycle. The primary system 3 is equipped with a load heat exchanger 31 for heat loads, an ambient air heat exchanger 32 for the ambient air, and a pump 33 of electric driven both directions type. The primary system 3 configures a circuit 34 of the cooling water in which the heat exchanger 31, the heat exchanger 32, and the pump 33 are connected in series. The load heat exchanger 31 makes possible to perform heat exchange between the battery 2 and the cooling water. The ambient air heat exchanger 32 makes possible to perform heat exchange between the ambient air outside to the vehicle and the cooling water. The ambient air heat exchanger 32 is the only one ambient heat exchanger in the vehicular thermo-control device 1. A fan 32a for flowing the ambient air to pass through the heat exchanger 32 may be disposed close to the heat exchanger 32. The heat exchanger 32 is also called a radiator. The pump 33 circulates the cooling water in the primary system 3. The pump 33 can switch the circulating direction of the cooling water in a first direction and a second direction opposite to the first direction. The pump 33 can be provided by a reversible type pump which switches water supplying direction by switching rotating direction of a motor. The pump 33 provides a switching device which switches the circulating direction of the thermal-transport medium.

The primary system 3 performs heat exchange between the battery 2 and the ambient air. The primary system 3 mainly provides heat dissipation to the ambient air from the battery 2. The primary system 3 may perform heat transportation from the ambient air to the battery 2, i.e., heating of the battery 2, when thermal conditions are fulfilled.

The primary system 3 is equipped with a bypass channel 35 which enables the cooling water to flow to bypass the heat exchanger 32. The bypass channel 35 is disposed in parallel with the heat exchanger 32. The bypass channel 35 and the circuit 34 are connected via branch portions. A three-port valve 36 is disposed on one of the branch portions. The three-port valve 36 can at least switch flow channel of the cooling water to a channel which passes only through the heat exchanger 32, and a channel which passes only through the bypass channel 35. Furthermore, the three-port valve 36 can adjust a ratio between a flow amount passing through the heat exchanger 32 and a flow amount passing through the bypass channel 35. The three-port valve 36 provides the flow amount control device which adjusts the flow amount of the cooling water passing the ambient air heat exchanger 32. A heat exchanging quantity between the ambient air and the cooling water can be adjusted by the three-port valve 36. An auxiliary heat source device 37 is disposed in the bypass channel 35. The heat source device 37 is a PTC (Positive Temperature Coefficient) heater. The heat source device 37 can heats the cooling water flowing through the bypass channel 35 when a current is supplied.

The vehicular thermo-control device 1 has a secondary system 4 thermally coupled only with the primary system 3. The secondary system 4 has a high-temperature-side heat exchanger 42 on a high-temperature-side and a low-temperature-side heat exchanger. 44 on a low-temperature-side, and has a device which creates a temperature difference among the heat exchangers 42 and 44. The secondary system 4 is provided by a cold-hot thermal device 4. The secondary system 4 may be called as a refrigerating cycle. The high-temperature-side heat exchanger 42 performs heat exchange only to the cooling water of the primary system 3. The low-temperature-side heat exchanger 44 performs heat exchange only to the cooling water of the primary system 3. Both the high-temperature-side heat exchanger 42 and the low-temperature-side heat exchanger 44 are thermally coupled with the primary system 3.

The cold-hot thermal device 4 is a refrigerating cycle of a vapor compression type. The cold-hot thermal device 4 is equipped with a compressor 41, a radiator 42, a decompression device 43, and an evaporator 44. The compressor 41 is an electric driven type compressor. The compressor 41 compresses a low pressure refrigerant which came out of the evaporator 44, and supplies a high pressure refrigerant to the radiator 42. The radiator 42 warms the cooling water by using the heat of the high pressure refrigerant. The radiator 42 is the first: heat exchanger that performs heat exchange between the primary system 3 and the secondary system 4. The radiator 42 is also called as the high-temperature-side heat exchanger 42. Since the radiator 42 provides the heat exchange between the cooling water and the refrigerant, it may also be called as a water-refrigerant heat exchanger. In a case that a condensable refrigerant is used, the radiator 42 may also be called as a condenser. The decompression device 43 decompresses the high pressure refrigerant which came out of the radiator 42. The evaporator 44 evaporates the refrigerant decompressed by the decompression device 43. The evaporator 44 cools the cooling water by evaporation of the refrigerant. The evaporator 44 is the second heat exchanger that performs heat exchange between the primary system 3 and the secondary system 4. The evaporator 44 is also called the low-temperature-side heat exchanger 44. Since the evaporator 44 performs heat exchange between the cooling water and the refrigerant, it may be also called as a water-refrigerant heat exchanger.

The heat-exchanger 42 is provided on one side to the heat exchanger 31 in the primary system 3. In other words, the heat exchanger 42 is disposed on one of two passages between the heat exchanger 31 and the heat exchanger 32. The heat-exchanger 44 is provided on another side to the heat exchanger 31 in the primary system 3. In other words, the heat exchanger 44 is disposed on another one of the two passages between the heat exchanger 31 and the heat exchanger 32. With this configuration, when the pump 33 flows the cooling water in the first direction, positions of the heat exchanger 44 and the heat exchanger 31 in the primary system 3 is set up so that the cooling water flows into the heat exchanger 31 from the heat exchanger 44. Moreover, when the pump 33 flows the cooling water in the second direction, positions of the heat exchanger 42 and the heat exchanger 31 in the primary system 3 is set up so that the cooling water flows into the heat exchanger 31 from the heat exchanger 42. According to this configuration, cooling of the thermal load and heating of the thermal load can be switched by switching the direction of flow of the thermal-transport medium which circulates through the primary system. The pump 33 provided as a switching device switches between the operational status which supplies the thermal-transport medium heated by the high-temperature-side heat exchanger 42 to the load heat exchanger 31 and the operational status which supplies the thermal-transport medium cooled by the low-temperature-side heat exchanger 44 to the load heat exchanger 31.

The vehicular thermo-control device 1 has a controller (CNTL) 5. The controller 5 is provided with a microcomputer having a storage medium readable by a computer. The storage medium stores a program readable by the computer. The storage medium can be provided by a memory device. The program, when executed by the control device 5, makes the control device 5 to function as devices described in this specification, and makes the control device 5 to perform a control method described in this specification. The means provided by the control device 5 may be referred to as a functional block or a module which performs a predetermined function.

The controller 5 controls devices electrically controllable, such as the pump 33, the compressor 41, and the three-port valve 36. The controller 5 controls devices in order to adjust a temperature of the battery 2 to a target temperature according to temperature information about the vehicular thermo-control device 1, such as a temperature of the battery 2 and an ambient air temperature. The target temperature can be set up as a desirable temperature zone in which the battery 2 can perform a predetermined performance. The controller 5 controls devices to perform a cooling operation when the temperature of the battery 2 is higher than the target temperature. The battery 2 is cooled in the cooling operation. As an amount of the thermal load for cooling the battery 2 increases, first the first cooling operation is performed and then the second cooling operation is performed. The controller 5 provides the cooling operation for cooling the thermal load by using the refrigerating cycle by activating the compressor 41 and controlling the switching device to make the circulating direction of the thermal-transport medium into the first direction.

The controller 5 controls devices to perform a heating operation, when the temperature of the battery 2 is lower than the target temperature. The battery 2 is heated in the heating operation. As an amount of the thermal load for heating the battery. 2 increases, first the first heating operation is performed and then the second heating operation or the third heating operation is performed. The heating operation may also be called as a warm-up operation. The controller 5 provides the heating operation for heating the thermal load by using the refrigerating cycle by activating the compressor 41 and controlling the switching device to make the circulating direction of the thermal-transport medium into the second direction. According to this configuration, cooling of the thermal load and heating of the thermal load can be performed by switching circulating direction of the thermal-transport medium in the primary system.

The vehicular thermo-control device 1 is equipped with a main unit 6 containing the battery 2 which is the thermal load, and the heat exchanger unit 7 which is mounted on the vehicle in a separated manner from the main unit 6. The main unit 6 is the device in which at least the battery 2 and the cold-hot thermal device 4 are combined so that they can be mounted on the vehicle as a single unit, and so that they can be handled as a unitary apparatus. According to this configuration, the cold-hot thermal device for adjusting the temperature of the thermal load is configured as a unit with the thermal load. For this reason, it is possible to mount the thermal load and the cold-hot thermal device as a unit. The main unit 6 is also called as a load unit 6 or the battery unit 6. At least the battery 2 and the cold-hot thermal device 4 are mounted on a common chassis or are accommodated in a common container to configure the main unit 6. The main unit 6 further has the pump 33, the bypass channel 35, the three-port valve 36, the heat source device 37, and the controller 5. The main unit 6 may have a plurality of terminals for the battery 2, control-signal terminals for the battery 2 and the controller 5, and power supply terminals for low-voltage devices, such as the controller 5 and the electric pump 33. The main unit 6 may be provided with a step down type electric power supply unit to supply electric power to the controller 5, the pump 33, and the compressor 41, etc. from the battery 2.

The main unit 6 is installed in suitable positions, such as a rear part on the vehicle. The heat exchanger unit 7 is installed in position where it is advantageous to supply the ambient air to the heat exchanger 32, such as a front part of the vehicle. Only the heat exchanger 32 provides the heat exchange with the ambient air in the vehicular thermo-control device 1.

The main unit 6 makes it easy to handle the vehicular thereto-control device 1. Moreover, according to this configuration, mounting work to the vehicle becomes easy. Many of main components for adjusting the temperature of the battery 2 are included in the main unit 6. For this reason, the battery 2 with a temperature adjusting function can be provided. Moreover, users can obtain and use a battery with a temperature adjusting function, without paying excessive attention to an internal structure of the main unit 6, or performance of parts.

As the battery 2 is used, the temperature of the battery 2 increases. For example, the temperature of the battery 2 rises by charging to the battery 2 or discharging from the battery 2. Therefore, if a temperature of the battery 2 becomes higher than a desirable temperature zone, then, in order to decrease the temperature of the battery 2, it is necessary to cool the battery 2. On the other hand, in a case that an operation of the vehicle begins when the ambient air temperature is low, the temperature of the battery 2 is also almost equal to the ambient air temperature. In such a case, the temperature of the battery 2 may be less than the desirable temperature zone. For this reason, within a time period before the battery 2 reaches the desirable temperature zone by self-generation of heat, it is necessary to warm up the battery 2. A controller 5 controls devices of the vehicular the device 1 to perform cooling and heating operation.

Figure 2:
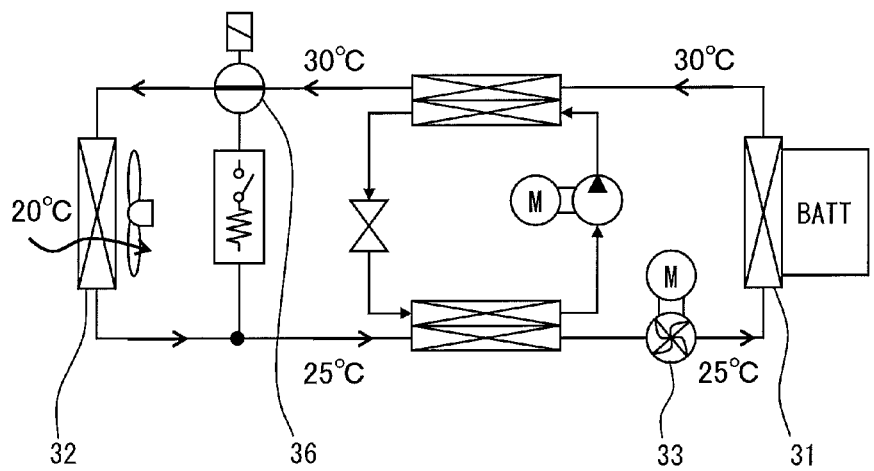
FIG. 2 is a block diagram showing one of operation state in the first embodiment.

FIG. 2 is a block diagram showing an operation in the first embodiment. In the drawing, exemplary examples of temperatures in several portions are illustrated. The temperatures in the drawing are examples which the inventors assumed. The controller 5 performs a first cooling operation, when the ambient air temperature is in the first temperature zone that can fully cool the battery 2. The first cooling operation only promotes heat dissipation from the battery 2. Therefore, this operational status may be also called as heat dissipating operation. Further, the controller 5 stops the compressor 41 and controls a switching device to make the circulating direction of the thermal-transport medium into the first direction or the second direction. The device provides the heat dissipating operation which dissipates heat to the ambient air by the primary system. According to this configuration, three operations can be provided by changing the circulating direction of the thermal-transport medium in the primary system, and changing activation/deactivation of the refrigerating cycle. The controller 5 rotates the pump 33 in either direction while stopping the cold-hot thermal device 4 by deactivating the compressor 41. In this embodiment, the pump 33 rotates in the first direction. The cooling water is led to the heat exchanger 32 and cooled by the ambient air. The cooling water cooled by the ambient air is supplied to the heat exchanger 31. As a result, the heat of the battery 2 is dissipated to the ambient air only by the primary system 3, and excessive increase in temperature of the battery 2 is avoided.

Figure 3:
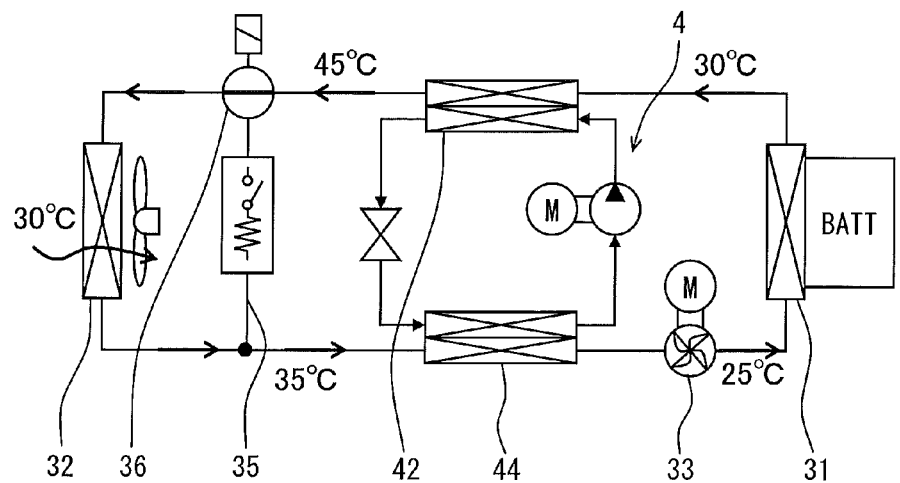
FIG. 3 is a block diagram showing one of operation state in the first embodiment.

FIG. 3 is a block diagram showing an operation in the first embodiment. In the drawing, examples of temperatures in several portions are illustrated. The controller 5 performs a second cooling operation, when the ambient air temperature is in the second temperature zone that can not fully cool the battery 2. For example, when the ambient air temperature is 30 degrees Celsius, it is impossible to prevent temperature rise on the battery 2 by using the heat dissipating operation. The controller 5 activates the cold-hot thermal device 4 by activating the compressor 41, and rotates the pump 33 in the first direction. Circulating direction of the cooling water is the first direction in which the cooling water flows in an order of the heat exchanger 31, the radiator 42, the heat exchanger 32, and the evaporator 44. At this time, the cooling water which came out of the heat exchanger 31 is further heated by the radiator 42, and then, is supplied to the heat exchanger 32. Since the ambient air whose temperature is lower than the cooling water flows through the heat exchanger 32, the cooling water is cooled by the ambient air in the heat exchanger 32. Therefore, the cold-hot thermal device 4 enables heat dissipation to the ambient air even at a high ambient air temperature by heating the cooling water. The cooling water cooled by the ambient air is supplied to the heat exchanger 31 after further cooled by the evaporator 44. As a result, the heat of the battery 2 is dissipated to the ambient air, and excessive increase in temperature of the battery 2 is avoided. With this configuration, cold thermal energy supplied by the cold-hot thermal device 4 is used to adjust the temperature of the battery 2.

Figure 4:
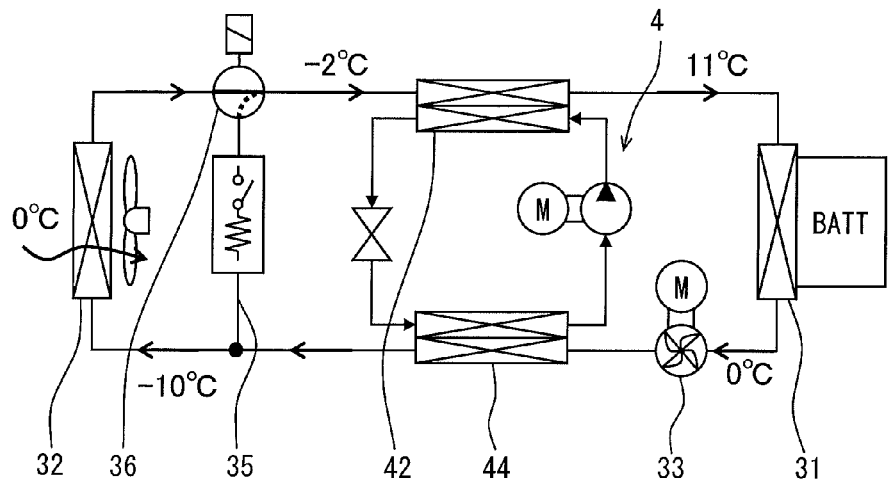
FIG. 4 is a block diagram showing one of operation state in the first embodiment.

FIG. 4 is a block diagram showing an operation in the first embodiment. In the drawing, examples of temperatures in several portions are illustrated. The controller 5 performs the first heating operation, when the cold-hot thermal device 4 can pump up heat for warming the battery 2 from the ambient air, i.e., when an ambient air temperature is in the third temperature zone. The controller 5 activates the cold-hot thermal device 4 by activating the compressor 41, and rotates the pump 33 in the second direction. Circulating direction of the cooling water is the second direction in which the cooling water flows in an order of the heat exchanger 31, the evaporator 44, the heat exchanger 32, and the radiator 44. At this time, the cooling water which came out of the heat exchanger 31 is further cooled by the evaporator 44, and then, is supplied to the heat exchanger 32. Since the ambient air whose temperature is higher than the cooling water flows through the heat exchanger 32, the cooling water is heated by the ambient air in the heat exchanger 32. Therefore, the cold-hot thermal device 4 enables pumping up of heat from the ambient air even at a low ambient air temperature by cooling the cooling water. The cooling water heated by the ambient air is supplied to the heat exchanger 31 after further heated by the radiator 42. Furthermore, the controller 5 may control the three-port valve 36 so that a part of the cooling water passes through the bypass channel 35. Thereby, the temperature of the cooling water in a lower stream side to the three-port valve 36 can be adjusted. With this configuration, hot thermal energy pumped up from the ambient air by the cold-hot thermal device 4 and hot thermal energy supplied by the cold-hot thermal device 4 are used to adjust the temperature of the battery 2.

Figure 5:
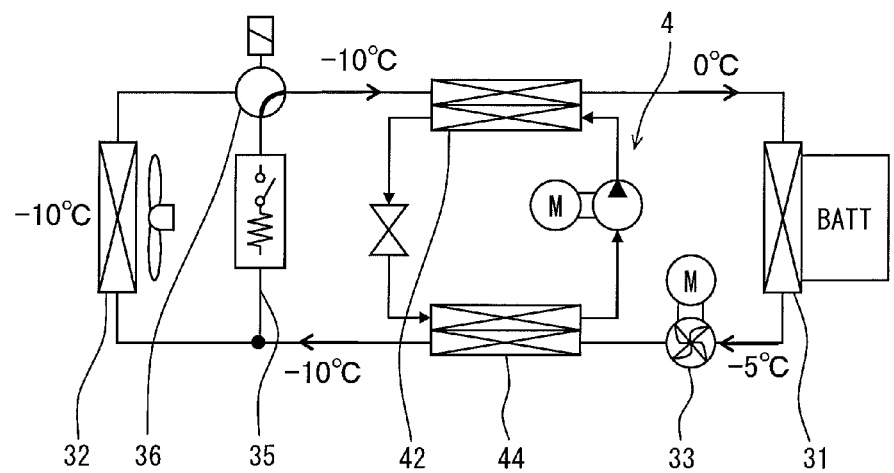
FIG. 5 is a block diagram showing one of operation state in the first embodiment.

FIG. 5 is a block diagram showing an operation in the first embodiment. In the drawing, examples of temperatures in several portions are illustrated. The controller 5 performs the second heating operation, when the cold-hot thermal device 4 cannot pump up heat for warming the battery 2 from the ambient air, i.e., when an ambient air temperature is in the fourth temperature zone. The controller 5 activates the cold-hot thermal device 4, and rotates the pump 33 in the second direction. The water supply direction of the pump 33 is the second direction. Furthermore, the controller 5 controls the three-port valve 36 to bypass the heat exchanger 32. At this time, the cooling water which came out of the heat exchanger 31 is further cooled by the evaporator 44, and then, is supplied to the radiator 42 while bypassing the heat exchanger 32. The ambient air whose temperature is equal to or lower than the cooling water flow through the heat exchanger 32. Therefore, in order to avoid the temperature fall of the cooling water, the heat exchanger 32 is bypassed. The cooling water is heated by the radiator 42, and then, is supplied to the heat exchanger 31. With this configuration, hot thermal energy supplied by the cold-hot thermal device 4 is used to adjust the temperature of the battery 2.

Figure 6:
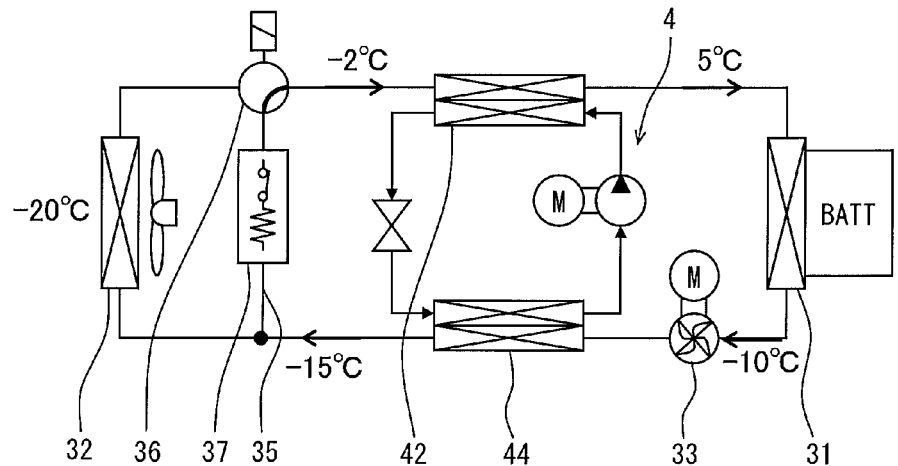
FIG. 6 is a block diagram showing one of operation state in the first embodiment.

FIG. 6 is a block diagram showing an operation in the first embodiment. In the drawing, examples of temperatures in several portions are illustrated. The controller 5 performs the third heating operation, when the cold-hot thermal device 4 alone cannot supply heat for warming the battery 2, i.e., when an ambient air temperature is in the fifth temperature zone. The controller 5 activates the cold-hot thermal device 4, and rotates the pump 33 in the second direction. The controller 5 controls the three-port valve 36 to bypass the heat exchanger 32. Furthermore, the controller 5 heats the cooling water with the heat source device 37 by turning on electricity to the heat source device 37 and activating it. At this time, the cooling water which came out of the heat exchanger 31 is further cooled by the evaporator 44, and then, is supplied to the heat source device 37 while bypassing the heat exchanger 32. The cooling water is heated by the heat source device 37, and then, is further heated by the radiator 42, and then, is supplied to the heat exchanger 31. With this configuration, hot thermal energy supplied by the cold-hot thermal device 4 and hot thermal energy supplied by the heat source device 37 are used to adjust the temperature of the battery 2. Therefore, the battery can be heated with the heat source device 37.

According to this embodiment, the vehicular thermo-control device 1 which is easy to mount on a vehicle and is simple in configuration is provided. According to this embodiment, it is possible to provide three operational status including heat dissipation from the battery (thermal load) 2 by the primary system 3, cooling of the battery 2 by the cold-hot thermal device 4, and heating of the battery 2 by the cold-hot thermal device 4. According to this embodiment, both the high-temperature-side heat exchanger 42 and the low-temperature-side heat exchanger 44 of the cold-hot thermal device 4 are arranged to perform heat exchange with the cooling water (thermal-transport medium) in the primary system 3. The vehicular thermo-control device 1 has the single heat exchanger for the ambient air. For this reason, a configuration is simple. Moreover, mounting work to the vehicle can become easy.

Moreover, the high-temperature-side heat exchanger 42 and the low-temperature-side heat exchanger 44 are arranged at the both sides of the heat exchanger 31 for the battery 2 in the primary system 3. Furthermore, it is configured to be able to change the flow direction of the cooling water in the primary system 3. For this reason, it is possible to switch cooling of the battery 2 and heating of the battery 2 with a simple configuration.

Second Embodiment

Figure 7:
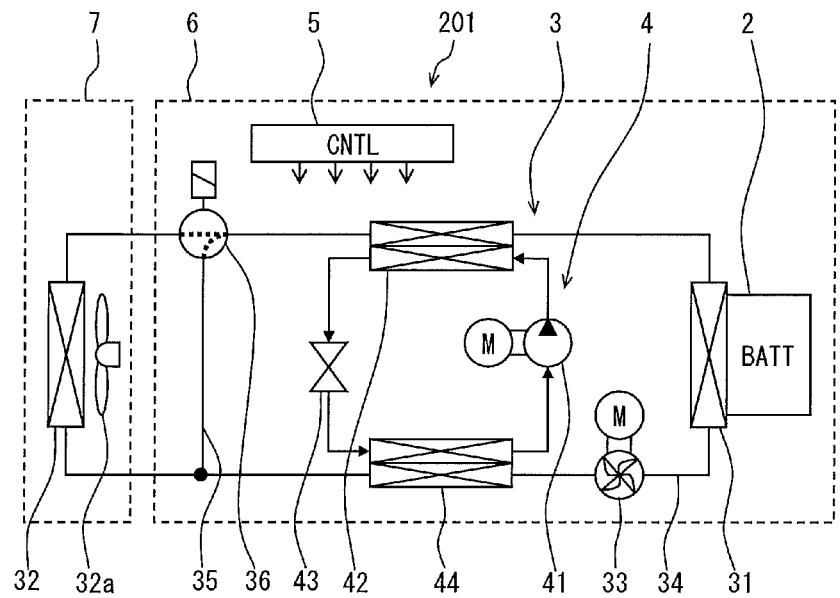
FIG. 7 is a block diagram showing a vehicular thermo-control device according to a second embodiment of the present disclosure.

FIG. 7 is a block diagram showing a vehicular thermo-control device 201 according to a second embodiment of the present disclosure. In the preceding embodiment, the third heating operation is provided by disposing the heat source device 37. Alternatively, it is possible to not dispose the heat source device 37, and to employ a vehicular thermo-control device 201 which does not perform the third heating operation.

Third Embodiment

Figure 8:
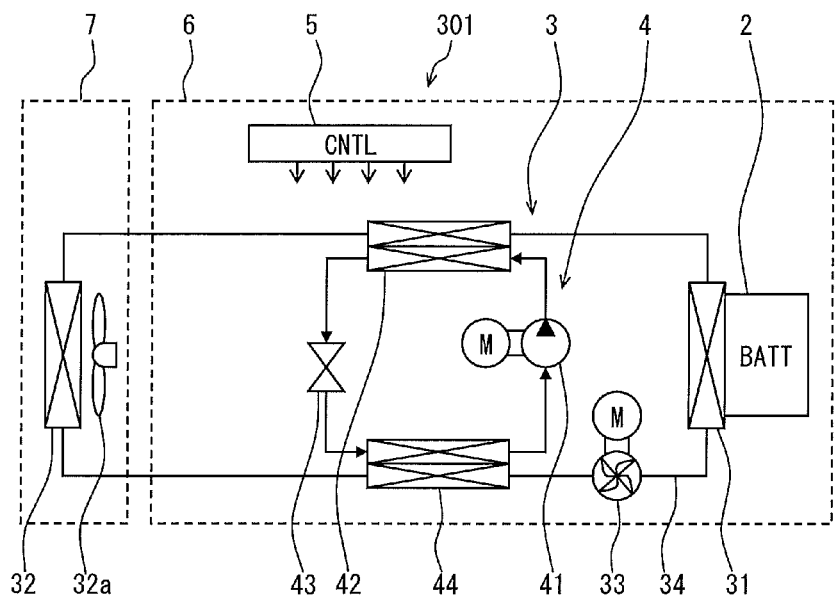
FIG. 8 is a block diagram showing a vehicular thermo-control device according to a third embodiment of the present disclosure.

FIG. 8 is a block diagram showing a vehicular thermo-control device 301 according to a third embodiment of the present disclosure. In the preceding embodiment, the second heating operation and the third heating operation are provided by disposing the bypass channel 35. Alternatively, a vehicular thermo-control device 301 which does not have any bypass channel 35 and does not perform the second and third heating operations can be adopted. In this configuration, an operation in which the fan 32a is stopped instead of the second heating operation may be performed. Specifically, the controller 5 activates the fan 32a, when the cold-hot thermal device 4 can pump up heat for warming the battery 2 from the ambient air, i.e., when an ambient air temperature is in the third temperature zone. The controller 5 stops the fan 32a, when the cold-hot thermal device 4 cannot pump up heat for warming the battery 2 from the ambient air, i.e., when an ambient air temperature is in the fourth temperature zone.

Fourth Embodiment

Figure 9:
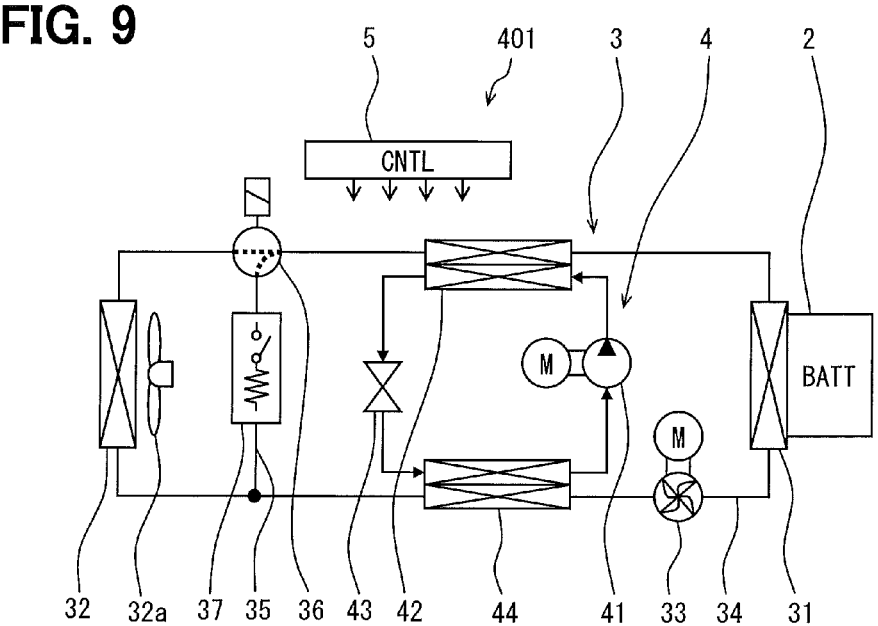
FIG. 9 is a block diagram showing a vehicular thermo-control device according to a fourth embodiment of the present disclosure.

FIG. 9 is a block diagram showing a vehicular thermo-control device 401 according to a fourth embodiment of the present disclosure. In the preceding embodiment, the device is mounted on the vehicle by configuring the main unit 6 and the heat exchanger unit 7. Alternatively, in this embodiment, a plurality of elements is not configured as a unit and is mounted on the vehicle in a dispersed manner.

Fifth Embodiment

Figure 10:
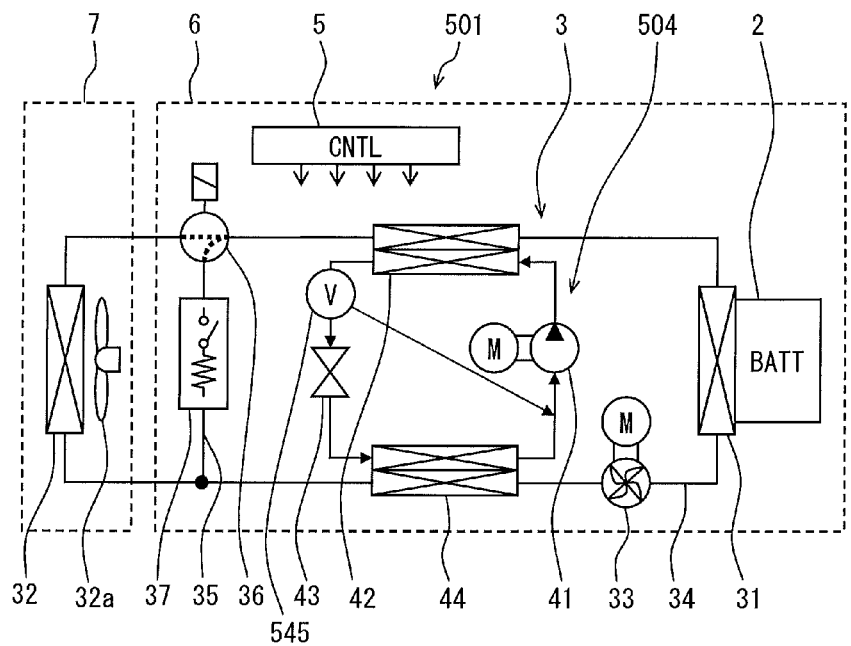
FIG. 10 is a block diagram showing a vehicular thermo-control device according to a fifth embodiment of the present disclosure.

FIG. 10 is a block diagram showing a vehicular thermo-control device 501 according to a fifth embodiment of the present disclosure. In the preceding embodiment, the cold-hot thermal device 4 is a refrigerating cycle with a fundamental configuration. Alternatively, a cold-hot thermal device 504 which consists of a refrigerating cycle having a hot-gas-bypassing function may be employed. The cold-hot thermal device 504 has a hot-gas-bypassing device 545 which returns directly the refrigerant which came out of the radiator 42 to a suction side of the compressor 41 without letting the refrigerant pass the evaporator 44. The hot-gas-bypassing device 545 can have a hot-gas-bypassing passage and a valve which opens and closes the passage. In this configuration, the controller 5 controls the hot-gas-bypassing device 545 so that the cold-hot thermal device 504 is operated as a hot gas cycle in the heating operation.

Sixth Embodiment

Figure 11:
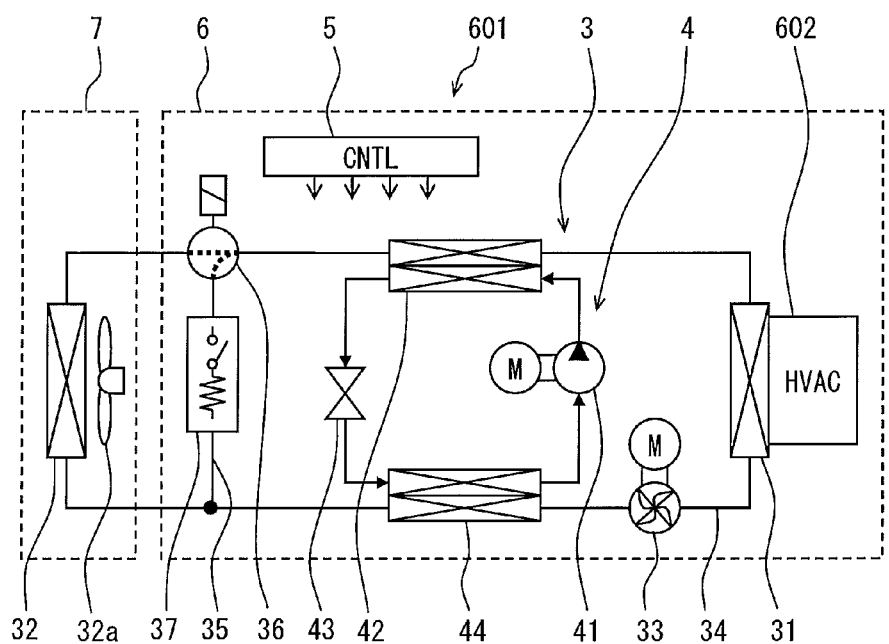
FIG. 11 is a block diagram showing a vehicular thermo-control device according to a sixth embodiment of the present disclosure.

FIG. 11 is a block diagram showing a vehicular thereto-control device 601 according to a sixth embodiment of the present disclosure. In the preceding embodiment, an objective of thermo-control, i.e., a thermal load is the battery 2. Alternatively, variety of devices which needs thermo-control may be employed as a heat load. For example, in the illustrated embodiment, a vehicular thermo-control device 601 adjusts a temperature of air in passenger compartment. That is, the heat load of the vehicular thermo-control device 601 is an air-conditioning device (HVAC) 602.

Other Embodiments

The preferred embodiments of the present disclosure have been described. However, the present disclosure is not limited to the above embodiments, and the above embodiments may be modified in various ways without departing from the spirit and scope of the invention. The configuration of the above described embodiments is just examples. The disclosure in its broader terms is therefore not limited to the specific details, representative apparatus, and illustrative examples shown and described. The extent of the present disclosure is shown by the scope of the claims, and also includes the changes, which is equal to and within the same range of the scope of the claim.

For example, the battery 2 and/or the air-conditioning device are adopted as a heat load in the preceding embodiments. Alternatively, the device may be configured to control temperature of variety of devices mounted on a vehicle. For example, a fuel cell may be adopted instead of the battery 2.

In the preceding embodiments, the refrigerating cycle of a vapor compression type is adopted as the cold-hot thermal device 4. Alternatively, it is possible to use a thermoelectric effect type refrigerating device using the Peltier effect. Alternatively, it is possible to use a magneto-caloric-effect type refrigerating device using the magneto-caloric-effect element.

In the preceding embodiments, the three-port valve 36 which adjusts the flow amount of the cooling water passing through the heat exchanger 32 is disposed. Alternatively, a passage bypassing the heat exchanger 31 and a valve device which adjusts the flow amount passing through the heat exchanger 31 may be disposed and adopted. In this case, a heat exchanging quantity between the heat load and the cooling water is adjusted. Therefore, the primary system may have a flow amount control device which adjusts a flow amount of the thermal-transport medium passing through the heat exchanger belonging to the primary system, i.e., the ambient heat exchanger 32 or the load heat exchanger 31. As a result, the heat exchanging quantity between the ambient air and the thermal-transport medium or the heat exchanging quantity between the heat load and the thermal-transport medium may be adjusted.

In the preceding embodiments, the electric heater is adopted as the heat source device 37. Alternatively, a variety of heat generating devices mounted on a vehicle may be used. For example, the heat source device 37 may be provided by an inverter circuit which controls the electric power to the electric motor. Moreover, the heat source device 37 may be disposed on the circuit 34 instead of the bypass channel 35.

In the preceding embodiments, the high-temperature-side heat exchanger 42 is disposed on one side to the heat exchanger 31 and the low-temperature-side heat exchanger 44 is disposed on the other side, and the cooling operation and the heating operation are switched by using the electric driven pump 33 of a both-direction type. Alternatively, a variety of switching devices may be used. For example, alternative to the pump 33, a pump only for the first direction and a pump only for the second direction connected in parallel may be used, and these pumps may be selectively activated. Moreover, a valve system which swaps an inlet and an outlet of the heat exchanger 31 may be used. In either configuration, a switching device switches among the operational status which supplies the thermal-transport medium heated by the heat exchanger 42 to the heat exchanger 31 and the operational status which supplies the thermal-transport medium cooled by the heat exchanger 44 to the heat exchanger 31.

In the preceding embodiments, the device which controls a temperature of one heat load, such as the battery 2 or the air-conditioning device 602 is explained. Alternatively, the vehicular thermo-control device may be configured so that temperatures of a plurality of heat loads are adjusted. For example, the battery 2 and the air-conditioning device 602 may be connected in parallel. Moreover, an air-conditioning heat exchanger may be disposed so that the cooling water in low temperature acquired in the primary system 3 is used for cooling air. Moreover, an air-conditioning heat exchanger may be disposed so that the cooling water in high temperature acquired in the primary system 3 is used for heating air.

For example, means and functions provided by the control device may be provided by only software, by only hardware, or those combination. For example, the control device may be configured by an analog circuit.

The invention claimed is:

1. A vehicular thermo-control device comprising: a thermal load mounted on a
vehicle; a primary system, a thermal-transport medium circulates through the primary system,
the primary system having a load heat exchanger for carrying out heat exchange between the thermal load and the thermal-transport medium and an ambient heat exchanger for carrying out heat exchange between an ambient air and the thermal-transport medium; and a cold-hot thermal device having a high-temperature-side heat-exchanger for carrying out heat exchange to the thermal-transport medium, and a low-temperature-side heat-exchanger for carrying out heat exchange to the thermal-transport medium, and provides a temperature difference between the high-temperature-side heat-exchanger and the low-temperature-side heat-exchanger, wherein the primary system includes a switching device, the switching device switches between an operational status in which the thermal-transport medium heated by the high-temperature-side heat-exchanger is supplied to the load heat exchanger and an operational status and the thermal-transport medium cooled by the low-temperature-side heat-exchanger supplied to the load heat exchanger, and wherein the high-temperature-side heat-exchanger is provided on one side to the load heat exchanger in the primary system, the low-temperature-side heat-exchanger is provided on another side to the load heat exchanger in the primary system, and the switching device switches circulating direction of the thermal-transport medium in a first direction and a second direction opposite to the first direction.

2. The vehicular thermo-control device in claim 1, wherein the cold-hot
thermal device is a refrigerating cycle having an electric driven type compressor, and using the high-temperature-side heat-exchanger as a radiator, and the low-temperature-side heat-exchanger as an evaporator, and wherein further comprises a controller activates or deactivates the compressor and controls the switching device to switch the circulating direction of the thermal-transport medium, wherein the controller provides: a cooling operation for cooling the thermal load by activating the compressor and controlling the switching device to make the circulating direction of the thermal-transport medium into the first direction; and a heating operation for heating the thermal load by activating the compressor and controlling the switching device to make the circulating direction of the thermal-transport medium to the second direction.

3. The vehicular thermo-control device in claim 2, wherein the controller
further provides: a heat dissipating operation dissipates heat to the ambient air by the primary system by deactivating the compressor and controlling the switching device to make the circulating direction of the thermal-transport medium into the first direction or the second direction.

4. The vehicular thermo-control device in claim 1, wherein the thermal load
and the cold-hot thermal device are configured to be able to be mounted on a vehicle as a single unit.

5. The vehicular thermo-control device in claim 1, wherein the thermal load
is a battery which supplies electric power to an electric motor for propelling the vehicle.

6. The vehicular thermo-control device in claim 1, wherein the thermal load
is an air-conditioning device.

7. The vehicular thermo-control device in claim 1, wherein the primary
system has a flow amount control device, the flow amount control device adjusts a flow amount of the
thermal-transport medium flowing through the heat exchangers in the primary system.

8. The vehicular thermo-control device in claim 1, further comprising a heat
source device heating the thermal-transport medium.

* * * * *